United States Patent
Xu et al.

(10) Patent No.: US 11,731,874 B2
(45) Date of Patent: Aug. 22, 2023

(54) SYSTEM AND METHOD FOR RESOURCE RECYCLING OF SULFUR DIOXIDE

(71) Applicants: NANJING GEKOF INSTITUTE OF ENVIRONMENTAL PROTECTION TECHNOLOGY & EQUIPMENT CO., LTD., Jiangsu (CN); NANJING TECH UNIVERSITY, Jiangsu (CN); JIANGSU DEYITONG ENVIRONMENTAL PROTECTION TECHNOLOGY CO., LTD., Jiangsu (CN); NANJING LIUYAN ENVIRONMENTAL PROTECTION TECHNOLOGY CO., LTD., Jiangsu (CN)

(72) Inventors: Haitao Xu, Nanjing (CN); Yanzhong Xu, Nanjing (CN); Mingbo Li, Nanjing (CN); Renyuan Chen, Nanjing (CN); Dahua Liu, Nanjing (CN); Zhenshan Wu, Nanjing (CN); Jing Song, Nanjing (CN); Meng Xu, Nanjing (CN)

(73) Assignees: NANJING GEKOF INSTITUTE OF ENVIRONMENTAL PROTECTION TECHNOLOGY & EQUIPMENT CO., LTD., Nanjing (CN); NANJING TECH UNIVERSITY, Nanjing (CN); JIANGSU DEYITONG ENVIRONMENTAL PROTECTION TECHNOLOGY CO., LTD., Nanjing (CN); NANJING LIYUAN ENVIRONMENTAL PROTECTION TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 17/784,264

(22) PCT Filed: May 10, 2020

(86) PCT No.: PCT/CN2020/089515
§ 371 (c)(1),
(2) Date: Jun. 10, 2022

(87) PCT Pub. No.: WO2021/114561
PCT Pub. Date: Jun. 17, 2021

(65) Prior Publication Data
US 2023/0046206 A1    Feb. 16, 2023

(30) Foreign Application Priority Data
Dec. 13, 2019    (CN) .......................... 201911286382.8

(51) Int. Cl.
*C01D 5/14* (2006.01)
*C01B 17/02* (2006.01)
(Continued)

(52) U.S. Cl.
CPC ........ *C01B 17/0482* (2013.01); *B01D 5/0072* (2013.01); *B01D 5/0093* (2013.01);
(Continued)

(58) Field of Classification Search
CPC .............. C01B 17/0482; C01B 17/021; C01B 17/0232; C01D 5/14; B01D 46/0036;
(Continued)

(56) References Cited

U.S. PATENT DOCUMENTS 3,667,908 A * 6/1972 Torrence ................. C01B 17/60
                                                         423/539
4,477,426 A * 10/1984 Raskin ................ C01B 17/0482
                                                         423/539
(Continued)

FOREIGN PATENT DOCUMENTS

| CN | 104071759 A | 10/2014 |
| CN | 105271132 A | 1/2016 |

(Continued)

OTHER PUBLICATIONS

Han, J., "Recovery of Sulfur from Waste Gasa Produced in Sulfur Refinery," Chemical World, Mar. 7, 1960, p. 148.

(Continued)

*Primary Examiner* — Timothy C Vanoy
(74) *Attorney, Agent, or Firm* — Oliff PLC

(57) ABSTRACT

A system for resource recycling of sulfur dioxide includes a charcoal reduction furnace, a high temperature dust remover, a cooling separator A, a liquid sulfur tank, a cooling separator, a tail gas absorption tower, a gas stripping tower, a hypo reactor, a centrifuge, a mother liquor tank and a thickener. And a method for resource recycling of sulfur dioxide includes the following steps: (1) preparing elemental sulfur, (2) removing dust from a process gas containing gaseous sulfur, (3) separating elemental sulfur, (4) reabsorbing residual $SO_2$ gas, (5) purifying sulfur powder, (6) preparing a slurry of cured hypo, (7) performing liquid-solid separation, and (8) preparing an absorption slurry. According to the method, $SO_2$ gas is reduced into liquid sulfur and sulfur powder, and sodium thiosulfate is coproduced.

12 Claims, 1 Drawing Sheet

(51) Int. Cl.
| | | |
|---|---|---|
| *C01B 17/04* | (2006.01) | |
| *B01D 5/00* | (2006.01) | |
| *B01D 46/00* | (2022.01) | |
| *B01D 53/50* | (2006.01) | |
| *B01D 53/80* | (2006.01) | |

(52) U.S. Cl.
CPC ....... *B01D 46/0036* (2013.01); *B01D 53/502* (2013.01); *B01D 53/80* (2013.01); *C01B 17/021* (2013.01); *C01B 17/0232* (2013.01); *C01D 5/14* (2013.01); *B01D 2251/304* (2013.01); *B01D 2251/608* (2013.01); *B01D 2257/302* (2013.01)

(58) Field of Classification Search
CPC .... B01D 5/0093; B01D 53/502; B01D 53/80; B01D 5/0072; B01D 2257/302; B01D 2251/304; B01D 2251/608; B01D 53/50; B01D 53/75; B01D 2251/20; B01D 2258/0283; B01J 19/00; B01J 2219/00002; B01J 2219/00006
See application file for complete search history.

(56) References Cited

U.S. PATENT DOCUMENTS

| | | | |
|---|---|---|---|
| 2017/0190575 A1* | 7/2017 | Hojjatie | ............ B01D 53/1481 |
| 2017/0190576 A1* | 7/2017 | Hojjatie | ................ C01B 17/64 |

FOREIGN PATENT DOCUMENTS

| | | | | |
|---|---|---|---|---|
| CN | 106467293 A | | 3/2017 | |
| CN | 106809807 A | | 6/2017 | |
| CN | 108 939 767 A | * | 12/2018 | ............ B01D 47/06 |
| EP | 0 158 748 A2 | * | 10/1985 | .......... B01D 53/507 |
| WO | 2017/004712 A1 | | 1/2017 | |

OTHER PUBLICATIONS

Sep. 4, 2020 International Search Report issued in International Patent Application No. PCT/CN2020/089515.

* cited by examiner

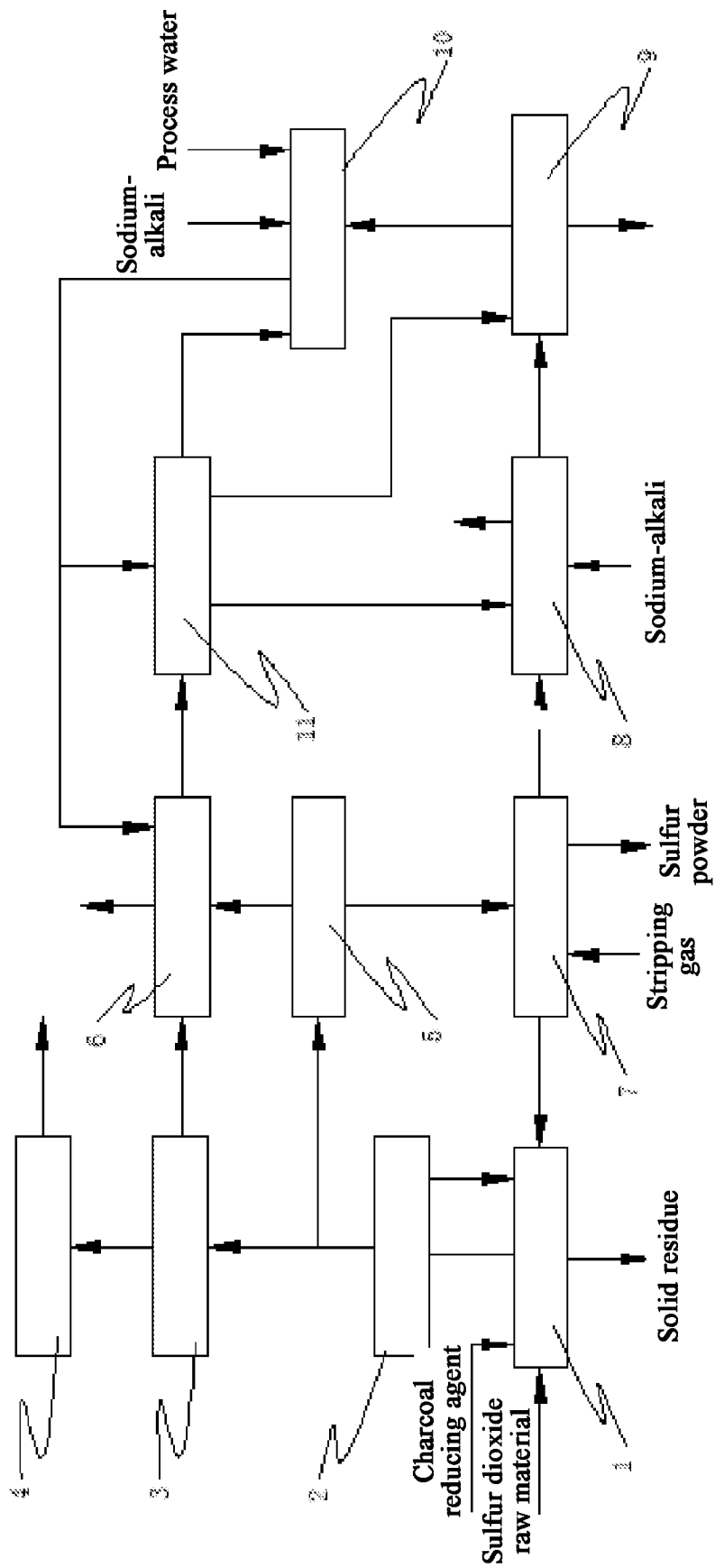

SYSTEM AND METHOD FOR RESOURCE RECYCLING OF SULFUR DIOXIDE

TECHNICAL FIELD

The present disclosure relates to the field of chemical industry, and particularly relates to a system and a method for resource recycling of sulfur dioxide.

BACKGROUND

Hundreds of millions of tons of sulfur dioxide are emitted from industrial waste gas every year. Conventional desulfurization or sulfur fixation technologies will form desulfurized by-products, such as gypsum, magnesium sulfate, ammonium sulfate, sulfuric acid and sodium sulfate. At present, desulfurized gypsum, magnesium sulfate, sodium sulfate, etc. are mainly wastes, and high costs are required to implement secondary treatment. Although ammonium sulfate, sulfuric acid, etc. all have certain economic value, the excess capacity of related products is large, and the value of by-products is much lower than the production cost. At present and for a long time in the future, the above two desulfurization process routes will continue at a loss. At the same time, the waste gas recycling technology has been proposed for many years, and the recognized best technical route is to directly reduce sulfur tetroxide to elemental sulfur. However, due to the fact that the primary reduction efficiency of sulfur dioxide is low in the market economy, the technology for treating $SO_2$ waste gas still fails to circumvent the above technical scope, and the reality of desulfurization of secondary pollutants or high cost of desulfurization still exists.

SUMMARY

The technical problem to be solved by the present disclosure is to provide a technology for resource recycling of sulfur dioxide. Charcoal reducing agents which are easily available in the market are used for efficiently reducing $SO_2$ directly, so as to obtain by-products such as elemental sulfur, sodium thiosulfate and other industrial products with high added value. The present disclosure has the characteristics of relatively low system investments, smooth sales of by-products, and no secondary waste.

To achieve the foregoing objectives, the technical solutions used in the present invention are as follows:

A system for resource recycling of sulfur dioxide is provided. The system includes a charcoal reduction furnace with a gas output end connected with a high temperature dust remover, a gas-phase output end of the high temperature dust remover is connected with a cooling separator A, and another gas-phase output end is connected with a cooling separator B;

a liquid-phase output end of the cooling separator A is connected with a liquid sulfur tank, a gas-phase output end of the cooling separator A is connected with a thickener through a tail gas absorption tower, an output end of the thickener is respectively connected with a hypo reactor, a centrifuge and a mother liquor tank, the hypo reactor is connected with the mother liquor tank through the centrifuge, and an output end of the mother liquor tank is respectively connected with the thickener and the tail gas absorption tower; and a gas-phase output end of the cooling separator B is connected with the tail gas absorption tower, a solid-phase output end of the cooling separator B is connected with a gas stripping tower, the gas stripping tower is connected with the centrifuge through the hypo reactor, a solid-phase output end of the centrifuge is a product, and a liquid-phase output end of the centrifuge is connected with the mother liquor tank.

In the above system, a solid-phase output end of the high temperature dust remover and a gas output end of the gas stripping tower are both connected with the charcoal reduction furnace.

In the above system, the gas stripping tower is also provided with an input pipeline for stripping gas and an output pipeline for sulfur powder.

In the above system, the hypo reactor is provided with an input pipeline for sodium-alkali, and the mother liquor tank is provided with input pipelines for sodium-alkali and process water.

A method for realizing resource recycling of sulfur dioxide by using the above system is provided. The method includes the following steps:

(1) preparation of elemental sulfur: in the charcoal reduction furnace, using a charcoal reducing agent to perform a redox reaction with original flue gas containing $SO_2$ to generate a process gas containing gaseous sulfur, and controlling the volume content of oxygen in the process gas to be 1.5% or less;

(2) removal of dust from process gas containing gaseous sulfur: removing the dust from the process gas containing gaseous sulfur in step (1) and sulfur vapor in the high temperature dust remover by using filter elements;

(3) separation of elemental sulfur: transporting the process gas containing gaseous sulfur after dust removal in step (2) into a condensation separator A and/or a condensation separator B for separation, so as to separate liquid sulfur through the condensation separator A and separate sulfur powder through the condensation separator B;

(4) reabsorption of residual $SO_2$ gas: absorbing and purifying the non-condensable gas leaving the condensation separator A and/or leaving the condensation separator B in step (3) by the tail gas absorption tower, and controlling a pH value of an absorption liquid in the absorption tower to be 6.5 or above;

(5) purification of sulfur powder: transporting the sulfur powder obtained in step (3) into the gas stripping tower which uses low-pressure nitrogen and/or the purified tail gas at the outlet of the tail gas absorption tower as a gas stripping medium, and after gas stripping, transporting part of the sulfur powder into the hypo reactor, and outputting the other part of the sulfur powder as a product;

(6) preparation of slurry of cured hypo: transporting the absorption liquid absorbed by the absorption tower into the thickener, placing the thickened slurry in the hypo reactor, adjusting the pH value to 10 with sodium-alkali, controlling a molar ratio of $Na_2SO_3$ to $H_2O$ in the hypo reactor at 1:(6.3-7.5), at the same time, adding the sulfur powder according to a molar ratio of 1:(1.1-1.2) of $S:Na_2SO_3$, and then, sealing the hypo reactor for heating and curing to obtain a suspension;

or directly producing a sodium sulfite slurry without adding the sulfur powder to the hypo reactor, which is specifically as follows:

preparation of sodium sulfite slurry: transporting the absorption liquid absorbed by the absorption tower into the thickener, placing the slurry in the hypo reactor, and adjusting the pH value to 10 with sodium-alkali to obtain the sodium sulfite slurry;

(7) liquid-solid separation: transporting the suspension obtained by heating and curing in step (6) into the centrifuge for separation to obtain a sodium thiosulfate wet product and a sodium thiosulfate mother liquor;

or transporting the sodium sulfite slurry into the centrifuge for separation to obtain a sodium sulfite wet product and a sodium sulfite mother liquor; and (8) preparation of absorption slurry: preparing an absorption liquid with a pH value of 10-12 and a relative density of 1.28-1.40 from the mother liquor, the process water and the sodium-alkali, and transporting the absorption liquid into the tail gas absorption tower and the thickener.

In the above method, the charcoal reduction furnace in step (1) can be divided into an ash cooling section, an $SO_2$ reducing section and a reducing agent preheating section from top to bottom according to the temperature during operation; and preferably, the temperature of a lower part of the ash cooling section is controlled at 250-380° C., the temperature of the $SO_2$ reducing section is controlled at 860-1100° C., and the temperature of an upper part of the reducing agent preheating section is controlled at 380-650° C.

In the above method, a mass metering ratio of the charcoal reducing agent to $SO_2$ in sulfur-containing flue gas in step (1) is $M_1:M_2=1:(2-8)$, where $M_1$ represents a mass flow rate of fixed carbon in the charcoal reducing agent, and $M_2$ represents a mass flow rate of $SO_2$ in the sulfur-containing flue gas; preferably, a molar ratio of zero valent sulfur to positive tetravalent sulfur in the process gas containing gaseous sulfur leaving the charcoal reduction furnace is $S(0):S(IV)=(1.3-95):1$; and further preferably, when the sulfur powder is produced, the ratio of $S(0):S(IV)$ is not less than 1.05, and when sodium thiosulfate is produced, the ratio of $S(0):S(IV)$ is controlled at 1.05-1.08.

In the above method, the temperature of the process gas containing gaseous sulfur entering the high temperature dust remover in step (2) is 380-650° C., and a temperature drop before and after the gas enters and leaves the high temperature dust remover is not greater than 30° C.

In the above method, the condensation separator A in step (3) uses the process hot water at 103-108° C. or the process gas at 70-105° C. as a cooling medium, and the process gas containing gaseous sulfur can be cooled to 105-113° C.; and the condensation separator B uses the process water at 15-100° C. or the process gas at 80° C. or below as a cooling medium, and the process gas containing gaseous sulfur can be cooled to 105° C. or below.

In the above method, stirring is performed in the heating and curing process in step (5), a stirring rate is adjusted to 26-35 r/min, a reaction temperature is controlled at 100-105° C., and a reaction time is controlled at 30-45 min.

In the above method, the charcoal reducing agent used in the process is a mixture of one or more substances in anthracite, graphite, coke, high-sulfur coal and petroleum coke, and the sodium-alkali used in the process is sodium carbonate, sodium hydroxide or a sodium hydroxide solution with a mass concentration of 30%-50%.

Beneficial effects of the present invention:

(1) a set of process system can produce a variety of by-products, and can be adjusted to produce liquid sulfur, sulfur powder, sodium sulfite, sodium thiosulfate and other products according to needs;

(2) the present disclosure coproduces sodium thiosulfate, solves the problem of low primary conversion rate in the production of sulfur from $SO_2$ gas, and can greatly reduce overall investments on the system and increase operational flexibility of the system, making possible the practical application of the technology of sulfur production from $SO_2$;

(3) the present disclosure avoids the problem of pollution resulting from a by-product in the process of producing sulfur from $SO_2$ and generates no wastewater; and (4) the sodium-alkali slurry is used for absorbing the tail gas so as to ensure the ultra-low emission of $SO_2$ in the tail gas.

BRIEF DESCRIPTION OF THE DRAWINGS

FIG. 1 is a schematic flow diagram of a system of the present disclosure.

1 represents reducing furnace, 2 represents high temperature dust remover, 3 represents cooling separator A, 4 represents liquid sulfur tank, 5 represents cooling separator B, 6 represents tail gas absorption tower, 7 represents gas stripping tower, 8 represents hypo reactor, 9 represents centrifuge, 10 represents mother liquor tank.

DETAILED DESCRIPTION

The present invention is further described below with reference to embodiments, but the protection scope of the present invention is not limited thereto.

As shown in FIG. 1, a system for resource recycling of sulfur dioxide is provided. The system includes a charcoal reduction furnace 1 with a gas output end connected with a high temperature dust remover 2, an output end of the high temperature dust remover 2 is connected with a cooling separator A3, and another output end is connected with a cooling separator B5;

a liquid output end of the cooling separator A3 is connected with a liquid sulfur tank 4, a gas output end of the cooling separator A3 is connected with a thickener 11 through a tail gas absorption tower 6, an output end of the thickener 11 is respectively connected with a hypo reactor 8, a centrifuge 9 and a mother liquor tank 10, the hypo reactor 8 is connected with the mother liquor tank 10 through the centrifuge 9, and an output end of the mother liquor tank 10 is respectively connected with the thickener 11 and the tail gas absorption tower 6; and a gas-phase output end of the cooling separator B5 is connected with the tail gas absorption tower 6, a solid-phase output end of the cooling separator B5 is connected with a gas stripping tower 7, the gas stripping tower 7 is connected with the centrifuge 9 through the hypo reactor 8, a solid-phase output end of the centrifuge 9 is a product, and a liquid-phase output end of the centrifuge 9 is connected with the mother liquor tank 10.

A solid-phase output end of the high temperature dust remover 2 and a gas-phase output end of the gas stripping tower 7 are both connected with the charcoal reduction furnace 1. The charcoal reduction furnace 1 is provided with an input pipeline for $SO_2$ raw material gas and an input pipeline for charcoal reducing agents, and a bottom of the charcoal reduction furnace 1 is provided with an output pipeline for solid residue. The gas stripping tower 7 is also provided with an input pipeline for stripping gas and an output pipeline for sulfur powder. The hypo reactor 8 is provided with an input pipeline for sodium-alkali, and the mother liquor tank 10 is provided with input pipelines for sodium-alkali and process water.

A method for resource recycling of sulfur dioxide by using the above system is shown in Examples 1-3.

Example 1

Synthesis of Sodium Thiosulfate and Sulfur Powder (1) Preparation of elemental sulfur: in the charcoal reduction furnace, anthracite, graphite, coke, high-sulfur coal or petroleum coke was used as a conventional charcoal reducing agent to perform a redox reaction with original flue gas containing $SO_2$ to generate a process gas containing gaseous sulfur, and the volume content of oxygen in the process gas was controlled to be 1.5% or less. The inside of the charcoal reduction furnace could be divided into an ash cooling section, an $SO_2$ reducing section and a reducing agent preheating section from top to bottom according to the temperature. The temperature of a lower part of the ash cooling section was controlled at 250-380° C., the temperature of the $SO_2$ reducing section was controlled at 860-1100° C., and the temperature of an upper part of the reducing agent preheating section was controlled at 380-650° C. A mass metering ratio of the charcoal reducing agent to $SO_2$ in sulfur-containing flue gas was $M_1:M_2=1:(3-8)$, where $M_1$ represented a mass flow rate of fixed carbon in the charcoal reducing agent, and $M_2$ represented a mass flow rate of $SO_2$ in the sulfur-containing flue gas.

S(0):S(IV) of the process gas containing gaseous sulfur leaving the charcoal reduction furnace was (1.05-95):1, where when the sulfur powder was produced, the ratio of S(0):S(IV) was not less than 1.05, and when sodium thiosulfate was produced, the ratio of S(0): S(IV) was controlled at 1.05-1.08.

(2) Removal of dust from process gas containing gaseous sulfur: the dust in the process gas containing gaseous sulfur in step (1) was separated from sulfur vapor by using filter elements such as ceramic filter elements and metal filter elements. The temperature of the process gas containing gaseous sulfur entering the high temperature dust remover was 380-650° C., the content of dust particles in the process gas containing gaseous sulfur leaving the high temperature dust remover was 20 mg/m³ or less, and a temperature drop before and after the gas enters and leaves the high temperature dust remover was not greater than 30° C.

(3) Separation of elemental sulfur: the process gas containing gaseous sulfur in step (2) was transported into the condensation separator B, the process water at 15-100° C. or the process gas at 80° C. or below was used in the condensation separator B to cool the process gas containing gaseous sulfur to 105° C. or below, and sulfur powder was separated.

(4) Reabsorption of residual $SO_2$ gas: the non-condensable gas leaving the condensation separator B in step (3) was absorbed and purified, a pH value of the absorption tower was controlled at 6.5 or above, the $SO_2$ content in the purified gas leaving the tail gas absorption tower was less than or equal to 10 mg/m³, and the dust content was less than or equal to 10 mg/m³.

(5) Purification of sulfur powder: the sulfur powder obtained in step (3) was transported into the gas stripping tower which uses low-pressure nitrogen and the purified tail gas at the outlet of the tail gas absorption tower as a gas stripping medium, and the gas stripping medium was heated to 103-110° C. and enters the gas stripping tower from the bottom of the gas stripping tower. The dry basis mass fraction of elemental sulfur in the sulfur powder leaving the gas stripping tower was not less than 99.6%, the sulfur powder was transported to the hypo reactor, and the excess sulfur powder was stored or packaged.

(6) Preparation of slurry of cured hypo: the absorption liquid in the tail gas absorption tower was transported into the thickener, the thickened slurry in the thickener was placed in the hypo reactor, the pH value was adjusted to 10 with sodium-alkali, a molar ratio of $Na_2SO_3$ to $H_2O$ in the hypo reactor was controlled at 1:(6.3-7.5), and the sulfur powder was added according to a molar ratio of 1:(1.1-1.2) of S:$Na_2SO_3$. The hypo reactor was sealed, a stirring rate was controlled at 26-35 r/min, a reaction temperature was controlled at 100-105° C., and a reaction time was controlled at 30-45 min.

(7) Liquid-solid separation: the temperature of the suspension obtained in step (6) was reduced to 50° C. or below, and then, the suspension was transported into the centrifuge for separation to obtain a sodium thiosulfate wet product and a sodium thiosulfate mother liquor.

(8) Preparation of absorption slurry: an absorption liquid with a pH value of 10-12 and a relative density of 1.28-1.40 was prepared from the mother liquor, the process water and the sodium-alkali.

Indexes of obtained sodium thiosulfate product

| Purity of $Na_2S_2O_3 \cdot 5H_2O$ % | Water-insoluble substance % | pH of solution | Heavy metal content (metered by Pb) % | Blue light whiteness | Comprehensive energy consumption kg standard coal/t |
|---|---|---|---|---|---|
| ≥98.5 | <0.025 | 6.5-8.5 | <0.002 | >85 | 187-220 |

Raw material in-and-out analysis

| Recovery rate of $SO_2$ % | Use rate of C % | $SO_2$ content in tail gas mg/m³ | Wastewater emission t/t-$SO_2$ |
|---|---|---|---|
| 99.98 | 65-75% | <10 | 0 |

Indexes of sulfur powder

| Purity of elemental sulfur % | Ash content % | Median diameter μm | Water content % | Heavy metal (metered by Pb) % |
|---|---|---|---|---|
| ≥99.2 | <0.02 | 115-140 | <0.2 | <0.0005 |

Example 2

Sodium Thiosulfate and Liquid Sulfur (1) Preparation of elemental sulfur: in the charcoal reduction furnace, anthracite, graphite, coke, high-sulfur coal or petroleum coke was used as a conventional charcoal reducing agent to perform a redox reaction with original flue gas containing $SO_2$ to generate a process gas containing gaseous sulfur, and the volume content of oxygen in the process gas was controlled to be 1.5% or less. The inside of the charcoal reduction furnace could be divided into an ash cooling section, an $SO_2$ reducing section and a reducing agent preheating section from top to bottom according to the temperature. The temperature of a lower part of the ash cooling section was controlled at 250-380° C., the temperature of the $SO_2$ reducing section was controlled at 860-1100°

C., and the temperature of an upper part of the reducing agent preheating section was controlled at 380-650° C. A mass metering ratio of the charcoal reducing agent to $SO_2$ in sulfur-containing flue gas was $M_1:M_2=1:(2-8)$, where $M_1$ represented a mass flow rate of fixed carbon in the charcoal reducing agent, and $M_2$ represented a mass flow rate of $SO_2$ in the sulfur-containing flue gas. S(0):S(IV) of the process gas containing gaseous sulfur leaving the charcoal reduction furnace was (1.05-1.20):1.

(2) Removal of dust from process gas containing gaseous sulfur was the same as that in Example 1.

(3) Separation of elemental sulfur: the process gas containing gaseous sulfur in step (2) was transported into the condensation separator A and the condensation separator B, where a molar ratio of the total amount of elemental sulfur in the process gas containing gaseous sulfur transported into the condensation separator B to the total amount of $SO_2$ in the process gas containing gaseous sulfur when leaving the high temperature dust remover was constrained between 1.05 and 1.10.

When the sulfur powder was produced, the ratio of S(0):S(IV) was not less than 1.05, and when sodium thiosulfate was produced, the ratio of S(0):S(IV) was controlled at 1.05-1.08.

The process hot water at 103-108° C. or the process gas at 70-105° C. was used in the condensation separator A to cool the process gas containing gaseous sulfur to 105-113° C., and liquid sulfur was separated. The process water at 15-100° C. or the process gas at 80° C. or below was used in the condensation separator B to cool the process gas containing gaseous sulfur to 105° C. or below, and sulfur powder was separated.

(4) Reabsorption of residual $SO_2$ gas was the same as that in Example 1.

(5) Purification of sulfur powder: the sulfur powder obtained in step (3) was transported into the gas stripping tower which uses low-pressure nitrogen and the purified tail gas at the outlet of the tail gas absorption tower as a gas stripping medium, and the gas stripping medium was heated to 103-110° C. and enters the gas stripping tower from the bottom of the gas stripping tower. The dry basis mass fraction of elemental sulfur in the sulfur powder leaving the gas stripping tower was not less than 99.6%, the sulfur powder was transported to the hypo reactor, the excess sulfur powder was stored or doped with the charcoal reducing agent to return to the charcoal reduction furnace, or the ratio of the process gas containing gaseous sulfur entering the condensation separator A was adjusted to produce liquid sulfur.

(6) Preparation of slurry of cured hypo was the same as that in Example 1.

(7) Liquid-solid separation was the same as that in Example 1.

(8) Preparation of absorption slurry was the same as that in Example 1.

Indexes of obtained liquid sulfur product
Indexes of obtained sodium thiosulfate product Raw material in-and-out analysis

| Recovery rate of $SO_2$ % | Use rate of C % | $SO_2$ content in tail gas mg/m³ | Wastewater emission t/t-$SO_2$ |
|---|---|---|---|
| 99.98 | 65-75% | <10 | 0 |

Indexes of liquid sulfur

| Purity of elemental sulfur % | Ash content % | Acidity (metered by sulfuric acid) % | Water content % | Heavy metal (metered by Pb) % |
|---|---|---|---|---|
| ≥99.2 | <0.02 | <0.01 | <0.2 | <0.0005 |

Example 3

Preparation of Liquid Sulfur and Sodium Sulfite (1) Preparation of elemental sulfur: in the charcoal reduction furnace, conventional charcoal reducing agents, such as anthracite, graphite, coke, high-sulfur coal and petroleum coke, were used to perform a redox reaction with original flue gas containing $SO_2$ to generate a process gas containing gaseous sulfur, and the volume content of oxygen in the process gas was controlled to be 1.5% or less. The inside of the charcoal reduction furnace could be divided into an ash cooling section, an $SO_2$ reducing section and a reducing agent preheating section from top to bottom according to the temperature. The temperature of a lower part of the ash cooling section was controlled at 250-380° C., the temperature of the $SO_2$ reducing section was controlled at 860-1100° C., and the temperature of an upper part of the reducing agent preheating section was controlled at 380-650° C. A mass metering ratio of the charcoal reducing agent to $SO_2$ in sulfur-containing flue gas was $M_1:M_2=1:(2-8)$, where $M_1$ represented a mass flow rate of fixed carbon in the charcoal reducing agent, and $M_2$ represented a mass flow rate of $SO_2$ in the sulfur-containing flue gas. S(0):S(IV) of the process gas containing gaseous sulfur leaving the charcoal reduction furnace was (1.05-95):1. Preferably, when the sulfur powder was produced, the ratio of S(0):S(IV) was not less than 1.05.

(2) Removal of dust from process gas containing gaseous sulfur was the same as that in Example 1.

(3) Separation of elemental sulfur: the process gas containing gaseous sulfur in step (2) was transported into the condensation separator A, the process hot water at 103-108° C. or the process gas at 70-105° C. was used in the condensation separator A to cool the process gas containing gaseous sulfur to 105-113° C., and liquid sulfur was separated.

(4) Reabsorption of residual $SO_2$ gas was the same as that in Example 1.

| Purity of $Na_2S_2O_3 \cdot 5H_2O$ % | Water-insoluble substance % | pH of solution | Heavy metal content (metered by Pb) % | Blue light whiteness | Comprehensive energy consumption kg standard coal/t |
|---|---|---|---|---|---|
| ≥98.5 | <0.025 | 6.5-8.5 | <0.002 | >85 | 187-220 |

(5) Preparation of sodium sulfite slurry: a pH value of the tail gas absorption tower was controlled at 7.5 or above, an alkali liquor was added to the thickener, and the pH value was adjusted to 10.

(6) Liquid-solid separation: the suspension obtained in step (5) was transported into the centrifuge for separation to obtain a sodium sulfite wet product and a sodium sulfite mother liquor.

(7) Preparation of absorption slurry: an absorption liquid with a pH value of 10-12 and a relative density of 1.28-1.32 was prepared from the mother liquor, the process water and the sodium-alkali.

Indexes of obtained sodium sulfite products

| Purity % | pH of solution | Clarity | Iron content (metered by Fe) % | Heavy metal (metered by Pb) % |
|---|---|---|---|---|
| ≥97.5 | 7.8-9.6 | Through experiments | <0.0003 | <0.001 |

Indexes of liquid sulfur

| Purity of elemental sulfur % | Ash content % | Acidity (metered by sulfuric acid) % | Water content % | Heavy metal (metered by Pb) % |
|---|---|---|---|---|
| ≥99.2 | <0.02 | <0.01 | <0.2 | <0.0005 |

What is claimed is:

1. A system for resource recycling of sulfur dioxide, wherein the system comprises a charcoal reduction furnace with a gas output end connected with a dust remover, a gas-phase output end of the dust remover is connected with a cooling separator A, and another gas-phase output end is connected with a cooling separator B;
   a liquid-phase output end of the cooling separator A is connected with a liquid sulfur tank, a gas-phase output end of the cooling separator A is connected with a thickener through a tail gas absorption tower, an output end of the thickener is respectively connected with a hypo reactor, a centrifuge and a mother liquor tank, the hypo reactor, is connected with the mother liquor tank through the centrifuge, and an output end of the mother liquor tank is respectively connected with the thickener and the tail gas absorption tower; and
   a gas-phase output end of the cooling separator B is connected with the tail gas absorption tower, a solid-phase output end of the cooling separator B is connected with a gas stripping tower, the gas stripping tower is connected with the centrifuge through the hypo reactor, a solid-phase output end of the centrifuge is a product, and a liquid-phase output end of the centrifuge is connected with the mother liquor tank.

2. The system for resource recycling of sulfur dioxide according to claim 1, wherein a solid-phase output end of the dust remover and a gas output end of the gas stripping tower are both connected with the charcoal reduction furnace.

3. The system for resource recycling of sulfur dioxide according to claim 1, wherein the gas stripping tower is also provided with an input pipeline for stripping gas and an output pipeline for sulfur powder.

4. The system for resource recycling of sulfur dioxide according to claim 1, wherein the hypo reactor is provided with an input pipeline for sodium-alkali, and the mother liquor tank is provided with input pipelines for sodium-alkali and process water.

5. A method for realizing resource recycling of sulfur dioxide by using the system according to claim 1, wherein the method comprises the following steps:
   (1) preparation of elemental sulfur: in the charcoal reduction furnace, using a charcoal reducing agent to perform a redox reaction with original flue gas containing $SO_2$ to generate a process gas containing gaseous sulfur, and controlling the volume content of oxygen in the process gas to be 1.5% or less;
   (2) removal of dust from process gas containing gaseous sulfur: removing the dust from the process gas containing gaseous sulfur in step (1) and sulfur vapor in the dust remover by using filter elements;
   (3) separation of elemental sulfur: transporting the process gas containing gaseous sulfur after dust removal in step (2) into a condensation separator A and/or a condensation separator B for separation, so as to separate liquid sulfur through the condensation separator A and separate sulfur powder through the condensation separator B;
   (4) reabsorption of residual $SO_2$ gas: absorbing and purifying the non-condensable gas leaving the condensation separator A and/or leaving the condensation separator B in step (3) by the tail gas absorption tower, wherein controlling a pH value of an absorption liquid in the absorption tower to be 6.5 or above;
   (5) purification of sulfur powder: transporting the sulfur powder obtained in step (3) into the gas stripping tower which uses nitrogen and/or the purified tail gas at the outlet of the tail gas absorption tower as a gas stripping medium, and after gas stripping, transporting part of the sulfur powder into the hypo reactor, and outputting the other part of the sulfur powder as a product;
   (6) preparation of slurry of cured hypo: transporting the absorption liquid absorbed by the absorption tower into the thickener, placing the thickened slurry in the hypo reactor, adjusting the pH value to 10 with sodium-alkali, controlling a molar ratio of $Na_2SO_3$ to $H_2O$ in the hypo reactor at 1:(6.3-7.5), at the same time, adding the sulfur powder according to a molar ratio of 1:(1.1-1.2) of $S:Na_2SO_3$, and then, sealing the hypo reactor for heating and curing to obtain a suspension;
   or directly producing a sodium sulfite slurry without adding the sulfur powder to the hypo reactor, which is specifically as follows:
preparation of sodium sulfite slurry: transporting the absorption liquid absorbed by the absorption tower into the thickener, placing the slurry in the hypo reactor, and adjusting the pH value to 10 with sodium-alkali to obtain the sodium sulfite slurry;
   (7) liquid-solid separation: transporting the suspension obtained by heating and curing in step (6) into the centrifuge for separation to obtain a sodium thiosulfate wet product and a sodium thiosulfate mother liquor, or transporting the sodium sulfite slurry into the centrifuge for separation to obtain a sodium sulfite wet product and a sodium sulfite mother liquor; and
   (8) preparation of absorption slurry: preparing an absorption liquid with a pH value of 10-12 and a relative density of 1.28-1.40 from the mother liquor, the process water and the sodium-alkali, and transporting the absorption liquid into the tail gas absorption tower and the thickener.

6. The method according to claim 5, wherein the charcoal reduction furnace in step (1) can be divided into an ash cooling section, an $SO_2$ reducing section and a reducing agent preheating section from top to bottom according to the temperature during operation.

7. The method according to claim 6, wherein the temperature of a lower part of the ash cooling section is controlled at 250-380° C., the temperature of the $SO_2$ reducing section is controlled at 860-1100° C., and the temperature of an upper part of the reducing agent preheating section is controlled at 380-650° C.

8. The method according to claim 5, wherein a mass metering ratio of the charcoal reducing agent to $SO_2$ in sulfur-containing flue gas in step (1) is M1:M2=1:(2-8), wherein M1 represents a mass flow rate of fixed carbon in the charcoal reducing agent, and M2 represents a mass flow rate of $SO_2$ in the sulfur-containing flue gas.

9. The method according to claim 8, wherein a molar ratio of zero valent sulfur to positive tetravalent sulfur in the process gas containing gaseous sulfur leaving the charcoal reduction furnace is S(0):S(IV)=(1.3-95):1; and further preferably, when the sulfur powder is produced, the ratio of S(0):S(IV) is not less than 1.05, and when sodium thiosulfate is produced, the ratio of S(0):S(IV) is controlled at 1.05-1.08.

10. The method according to claim 5, wherein the temperature of the process gas containing gaseous sulfur entering the dust remover in step (2) is 380-650° C., and a temperature drop before and after the gas enters and leaves the dust remover is not greater than 30° C.

11. The method according to claim 5, wherein the condensation separator A in step (3) uses the process hot water at 103-108° C. or the process gas at 70-105° C. as a cooling medium, and the process gas containing gaseous sulfur can be cooled to 105-113° C., and the condensation separator B uses the process water at 15-100° C. or the process gas at 80° C. or below as a cooling medium, and the process gas containing gaseous sulfur can be cooled to 105° C. or below.

12. The method according to claim 5, wherein stirring is performed in the heating and curing process in step (5), a stirring rate is adjusted to 26-35 r/min, a reaction temperature is controlled at 100-105° C., and a reaction time is controlled at 30-45 min.

\* \* \* \* \*